United States Patent [19]

Satoh et al.

[11] Patent Number: 5,373,397
[45] Date of Patent: Dec. 13, 1994

[54] LENS BARREL OF SHORT LENGTH HAVING THE CAPABILITY OF A LARGE ZOOMING MAGNIFICATION AND A ZOOM LENS CAPABLE OF A LARGE FORWARD MOVEMENT

[75] Inventors: Kazuhiro Satoh, Sagamihara; Shigeo Hayashi, Okaya, both of Japan

[73] Assignee: Olympus Optical Co. Ltd., Tokyo, Japan

[21] Appl. No.: 1,796

[22] Filed: Jan. 8, 1993

[30] Foreign Application Priority Data

Jan. 8, 1992 [JP] Japan .................. 4-001777
Oct. 1, 1992 [JP] Japan .................. 4-263810

[51] Int. Cl.⁵ .............................................. G02B 15/00
[52] U.S. Cl. ............................................... 359/699
[58] Field of Search .............. 359/694, 695, 696, 697, 359/698, 699, 822, 823, 825, 826

[56] References Cited

U.S. PATENT DOCUMENTS

| | | | |
|---|---|---|---|
| 4,349,265 | 9/1982 | Kobayashi et al. | 359/825 |
| 4,681,406 | 8/1987 | Naito et al. | 359/699 |
| 5,037,187 | 8/1991 | Oda et al. | 359/699 |
| 5,225,939 | 7/1993 | Iizuka | 359/699 |

FOREIGN PATENT DOCUMENTS 2-10515  1/1990 Japan .
2-248909 4/1990 Japan .
0275404 11/1990 Japan .................. 359/694

*Primary Examiner*—Edward K. Look
*Assistant Examiner*—Mark Sgantzos
*Attorney, Agent, or Firm*—Louis Weinstein

[57] ABSTRACT

A lens barrel having a fixed frame fixed to the body of a camera; a first cam frame mounted to rotate about the outer surface of the fixed frame; a second cam frame arranged inside the fixed frame and rotatable around the optical axis upon rotation of the first cam frame; a movable member integral with the second cam frame, extending in the direction of the optical axis and rotatable around the optical axis so that rotation of the movable member around the optical axis with respect to the fixed frame is restricted, the movable member having a linear-movement key extending in the direction of the optical axis; a lens holding frame inside the second cam frame and guided by with the movable member around the optical axis, the movable member being connected to the second cam frame on the outer surface thereof, the lens holding frame engaging the inner surface of the linear-movement key, and movable forward/rearward along the optical axis due to rotation of the second cam frame; and another lens holding frame movable forward/rearward along the optical axis due to rotation of the second cam frame, and limited to linear movement by the linear movement key.

36 Claims, 12 Drawing Sheets

LENS BARREL OF SHORT LENGTH HAVING THE CAPABILITY OF A LARGE ZOOMING MAGNIFICATION AND A ZOOM LENS CAPABLE OF A LARGE FORWARD MOVEMENT

BACKGROUND OF THE INVENTION

1. Field of the Invention

The present invention relates to a lens barrel, and more particularly to the structure of a lens barrel in which a lens holding frame is linearly moved in the direction of the optical axis by rotating a cam frame around a fixed frame.

2. Related Art Statement

Hitherto, a variety of cameras of a type having a zoom lens have been suggested and dealt in, and a multiplicity of technological means relating to the zoom lens have been suggested.

An example of the conventional technological means relating to the zoom lens portion will now be described with reference to a technological means disclosed in Japanese Patent Laid-Open No. 2-248909 filed by the applicant of the present invention.

The technological means is an improvement in the structure of the conventional zoom lens barrel composed of a cam ring, a fixed frame and a lens supporting frame and arranged so as to obtain an effect in that the overall length of the zoom lens barrel can be shortened.

Then, the structure of the aforesaid technological means will now be described with reference to FIG. 13.

A first cam ring 102 fitted around a fixed frame 101 has a linear-movement groove 102a. Furthermore, an interlocking cam 108 is integrally fastened to the outer surface of the first cam ring 102. Moreover, a second cam ring 103 is fitted to the inner surface of the fixed frame 101, and a movable frame 104 is fitted to the inner surface of the second cam ring 103. Furthermore, a second-group lens supporting frame 106 and a third-group lens supporting frame 107 are fitted to the inner surface of the movable frame 104. In addition, a first lens group frame 105 holding a first-group lens 116 is fixed to the movable frame 104. A second-group lens frame 117 holding a second group lens 118 is fastened to the second-group lens supporting frame 106 via a shutter unit 119. Moreover, a third-group lens supporting frame 107 holds a third-group lens 120 fixed to the third-group lens supporting frame 107.

On the other hand, a second-group roller (i.e. cam follower) 114 implanted in the second group lens supporting frame 106 is engaged with a linear-movement groove 104a formed in the movable frame 104 and a second-group lens cam groove 103b formed in the second cam ring 103. Furthermore, a third-group roller (i.e. cam follower) 115 implanted in the third-group lens supporting frame 107 is engaged with the linear-movement groove 104b formed in the movable frame 104 and the linear-movement groove 103c formed in the second cam ring 103.

Moreover, a first-group roller (i.e. cam follower) 113 implanted in the movable frame 104 is engaged with both of a first lens cam grove 103a formed in the second cam ring 103 and a linear-movement groove 101d formed in the fixed frame 101. A roller (i.e. cam follower) 112 implanted in the second cam ring 103 is engaged with a lead groove 101c formed in the fixed frame 101 and the linear-movement groove 102a formed in the first cam ring 102.

The operation of the zoom lens barrel thus constituted is performed as follows:

When an interlocking gear 108a is rotated due to rotation of a zooming motor 111 engaged with a reduction gear train 110, the first cam ring 102 is rotated around the optical axis O. As a result, the positional relationship among the linear-movement groove 102a, the lead groove 101c and the roller 112 causes the second cam ring 103 to be moved forward in the direction of the optical axis while being rotated relative to the optical axis. More particularly, rotation of cam ring 102 rotates second cam ring 103 due to the movement of roller 112 along cam grooves 102a and 101c.

Rotation of the second cam ring 103 causes the second cam ring 103 to be moved in the direction of the optical axis due to the movement of first group roller 113 as a result of the rotation of cam ring 103 and the structural relationship among the linear-movement groove 101d, the first-group lens cam groove 103a and the first-group roller 113. Hence, the relationship among the second-group lens cam groove 103b, the linear-movement groove 104a and the second-group roller 114 and that among the third-group lens cam groove 103c, the linear-movement groove 104b and the third-group roller 115 cause the second-group lens supporting frame 106 and the third-group lens supporting frame 107 to also be moved in the direction of the optical axis.

Assuming that the quantities of movements of the first-group lens 116, the second-group lens 118 and the third-group lens 120 respectively are PL1, PL2 and PL3, the optical directional length of the linear-movement groove 102a is PLA, and the optical directional lengths of the first-group lens cam groove 103a, the second-group lens cam groove 103b and the third lens cam groove 103c respectively are PLB, PLC and PLD, the following equations are held:

$$PL1 = PLA + PLB$$

$$PL2 = PLA + PLC$$

$$PL3 = PLA + PLD$$

Assuming that the allowable shortest length of the first cam ring 102 is X3, the allowable shortest length of the second cam ring 103 is X5, the shortest length from the roller 112 to the first-group roller 113 is PLM and the minimum length from the second-group roller 114 to the third-group roller 115 is PLN, the following relationships are held:

$$X3 > PLA + PLM$$

$$X5 > MAX\ (PLB,\ PLC,\ PLD) + PLN$$

Therefore, if the overall length of the lens is made to be the shortest length, PL holds the following relationship:

$$PL > MAX\ (X3, X5)$$

Hence, if length PL is the shortest length, the following equation is held:

$$PLA = \tfrac{1}{2}\ (MAX\ (PL1, PL2, PL3))$$

Assuming that PL1 is the longest length, the following equation is held:

$$PLA = \tfrac{1}{2} \times PL1$$

Hence, the following relationship is held:

$$PL > \tfrac{1}{2} \times PL1 + PLM \text{ (or } PLN)$$

That is, if the overall length of the lens barrel is the shortest length, length PL is longer than half of the maximum quantity of the movement of a lens group, in which the quantity of the movement of the zoom lens is the largest quantity.

If $PLA = \tfrac{1}{2} PL1$, the following equation is held:

$$PLB = PL1$$

As a result, the first-group lens cam groove 103a is formed to have the same length as the overall length of the second cam ring 103, causing the first-group lens cam groove 103a to appear outside in a telescope state due to zooming. That is, the lens barrel of the aforesaid type cannot exist.

Therefore, PLA must be considerably larger than $\tfrac{1}{2} > L1$, causing the following relationship to be held:

$$PL >> \tfrac{1}{2} \times PL1 + PLM \text{ (or } PLN)$$

Although a zoom lens barrel of the type structured as described above enables the overall length thereof to be shortened as compared with the prior zoom lens barrel, the shortened quantity has been unsatisfactory. Therefore, the amount of movement of the zoom lens is necessarily increased in the recent circumstance in which the zooming magnification has been enlarged, causing a problem to take place in that the overall length of the lens barrel cannot be shortened.

In order to overcome the aforesaid problem, a technological means has been suggested in Japanese Utility Model Laid-Open No. 2-10515 with which a zoom lens barrel revealing a large magnification while necessitating a short overall length of the lens barrel is provided. The aforesaid lens barrel has a cam ring comprising an inner helicoid member connected to an outer helicoid member fixed to the fixed frame. Furthermore, the lens barrel has a guide ring capable of rotating around the optical axis with respect to the cam ring, the guide ring being formed integrally with the cam ring in the direction of the optical axis (integrally formed around the optical axis with respect to the fixed frame). A cam groove for moving the lens and a linear-moving groove are respectively formed in the inner surfaces of the aforesaid cam ring and the guide ring. Moreover, a lens-group holding frame having cam followers to be received by the cam ring and the guide ring is fitted to the inner surface of the guide ring.

When the inner helicoid member is rotated around the optical axis in the aforesaid state, the cam ring formed integrally with the inner helicoid member is moved in the direction of the optical axis while being rotated. The aforesaid operation causes the guide ring to be moved forwards or rearwards by the same amount as the corresponding amount of movement of the cam ring, causing the guide ring to be rotated around the optical axis. However it is not rotated with respect to the fixed frame.

Hence, each of the lens-group holding frames is able to be moved in the direction of the optical axis by a length corresponding to the quantity of the movement of the cam ring and corresponding to the optical directional length of the cam ring in the cam groove. As a result, the length of the cam ring and that of the fixed frame can be made shorter than the quantity of the movement of each lens-group holding frame, namely, a movement quantity larger than the optical directional length of the cam ring and that of the fixed frame.

However, the fact that the guide ring can be disposed on only the outer surface of the lens-group holding frame will cause a problem in that the outer diameter of the lens barrel cannot be reduced. What is worse, the quantity of the movement of the cam ring with respect to the fixed frame is limited by the optical directional length of the inner helicoid member, causing the length of the cam groove formed in the cam ring and receiving each lens-group holding frame to be inevitably increased. Hence, the length of the cam ring cannot be shortened, causing the overall length of the lens barrel to be increased. As a result, it is as yet difficult to provide a camera having a reduced size and a large zooming magnification.

OBJECTS AND SUMMARY OF THE INVENTION

A first object of the present invention is to provide a zoom lens barrel, which is adaptable to a camera having a large zooming magnification and a long distance of forward movement of the zoom lens, and which barrel has a short length.

A second object of the present invention is to provide a zoom lens barrel, which is adaptable to a camera having a large zooming magnification and a long distance of forward movement of the zoom lens, the overall length of which barrel is short, and which barrel is capable of preventing introduction of outside light into the lens barrel so as to prevent light leakage to the surface of the film.

A third object of the present invention is to provide a lens barrel which is adaptable to a camera having a long distance of forward movement of the zoom lens, and the overall length of which is short.

A fourth object of the present invention is to provide a lens barrel, which is adaptable to a camera having a long distance of forward movement of the lens, the overall length of which is short, and which is capable of preventing introduction of outside light into the lens barrel so as to prevent light leakage to the surface of the film.

In order to achieve the aforesaid objects, a lens barrel according to the present invention comprises:
- a fixed frame fixed to the body of a camera;
- a first cam frame rotatably disposed on the outer surface of the fixed frame around the optical axis;
- a second cam frame disposed in the fixed frame, and rotatable around the optical axis with respect to the fixed frame due to rotation of the first cam frame with respect to the fixed frame;
- a movable member coupled with the second cam frame to move in the direction of the optical axis and rotatable around the optical axis in such a manner that rotation of the movable member around the optical axis with respect to the fixed frame is restricted and the movable member has a linear-movement key extending in the direction of the optical axis;
- a lens holding frame so disposed in the second cam frame driven by the second cam frame surrounding the outer surface thereof, and guided by the linear-movement key of the movable member along the inner surface thereof, and arranged to move forward/rearward in the direction of the optical axis with respect to the second cam frame due to rotation of the second cam frame with respect to the fixed frame; and another lens holding frame driven by the second cam frame and guided by the linear-movement key on the outer surface thereof, to move forward/rearward in the direction of the optical axis with respect to the second cam frame due to rotation of the second cam frame with respect to the fixed frame.

The above as well as other objects and advantages of the present invention will become further apparent from the following detailed explanation.

DETAILED DESCRIPTION OF THE PREFERRED EMBODIMENTS

Preferred embodiments of the present invention will now be described with reference to the drawings.

Figure 1:
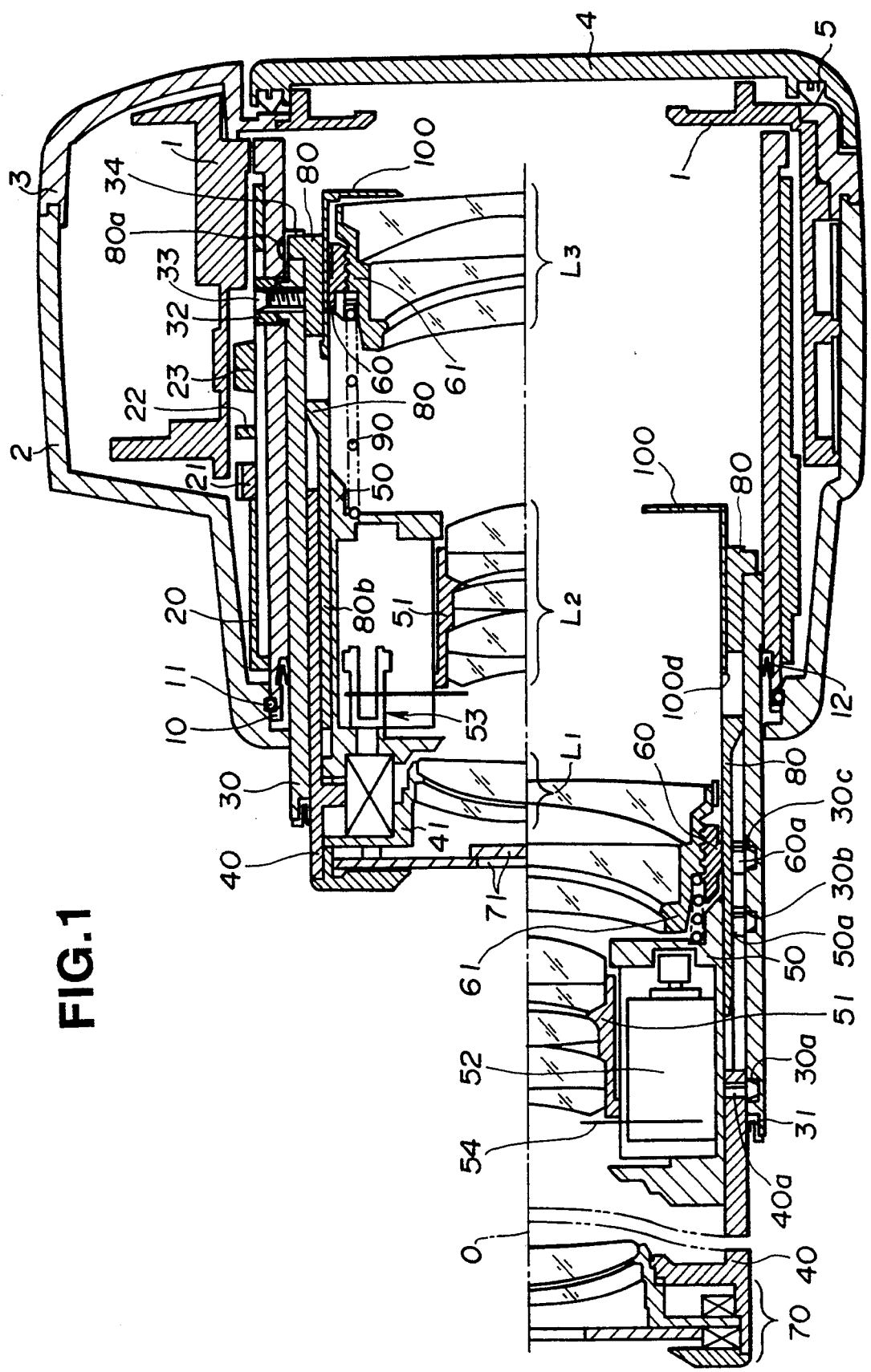
FIG. 1 is a cross sectional view which illustrates a first embodiment of a zoom lens barrel according to the present invention.
Figure 2:
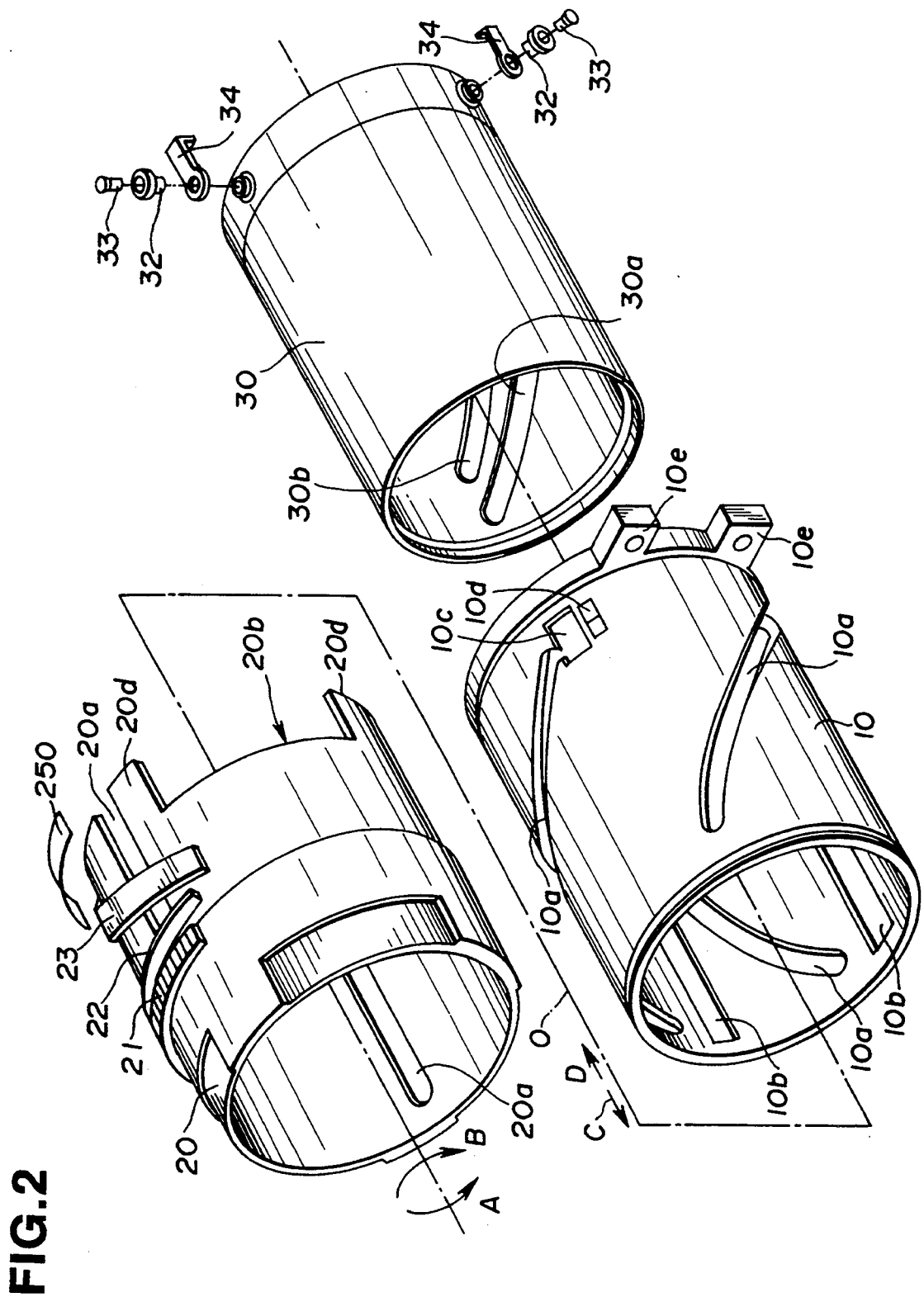
FIG. 2 is an exploded perspective view which illustrates elements of the first embodiment while elongating the elements in the direction of the optical axis.
Figure 3:
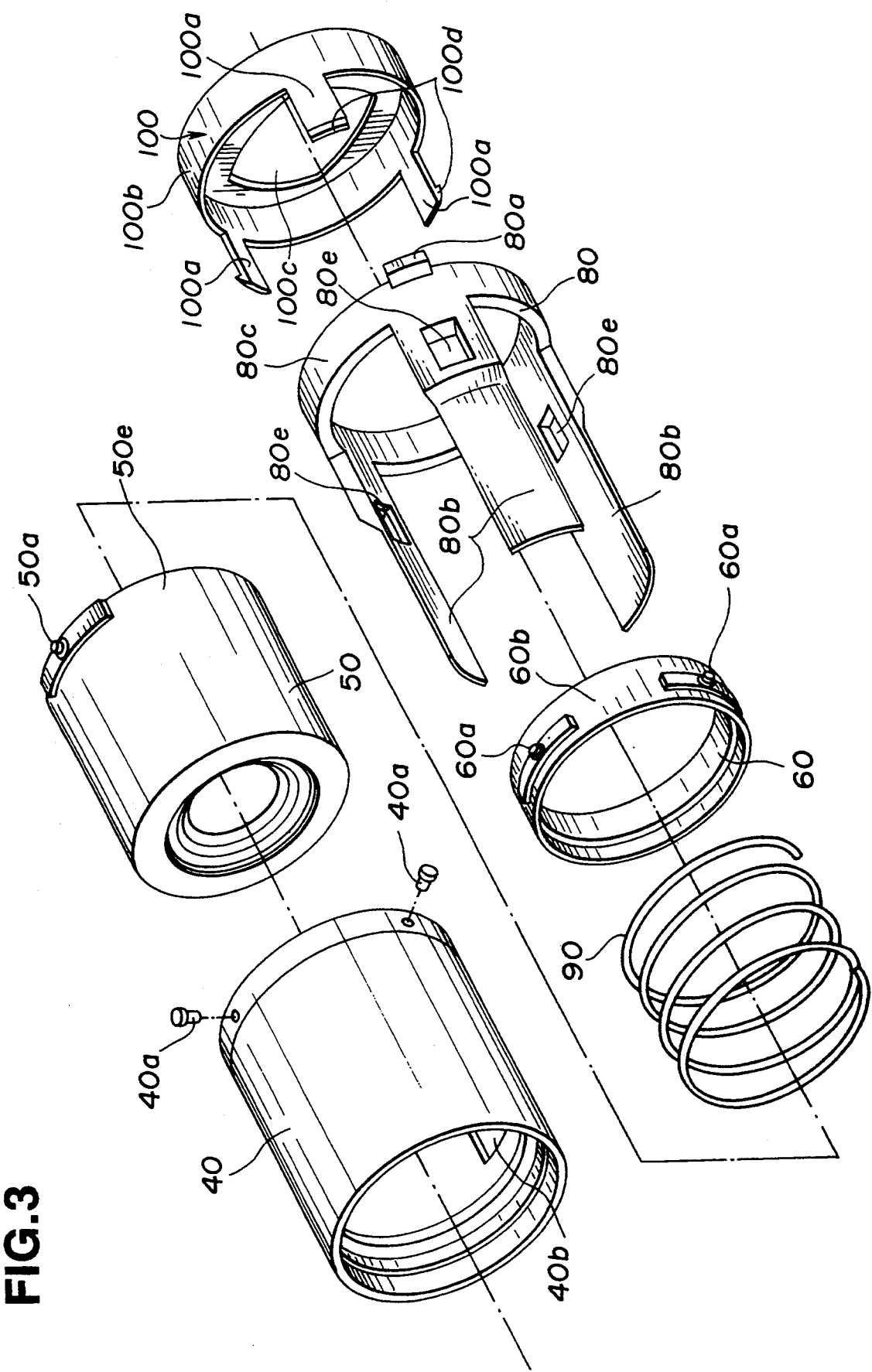
FIG. 3 is an exploded perspective view which illustrates elements of the first embodiment while elongating the elements in the direction of the optical axis.

FIG. 1 is a cross sectional view which illustrates an essential portion of a camera having a lens barrel according to an embodiment of the present invention. FIGS. 2 and 3 are exploded perspective views which illustrate the elements of the lens barrel according to this embodiment of the present invention while lengthening the elements in the direction of the optical axis.

This embodiment utilizes the present invention to a zoom lens barrel. The zoom lens barrel according to this embodiment comprises a fixed frame in the form of cylinder 10, integrally fastened to a camera body 1. The upper portion of FIG. 1 illustrates a wide state in which the zoom lens is moved to a wide angle position, while the lower portion illustrates a telephoto state in which the zoom lens is moved to a telephoto position.

The camera having the aforesaid lens barrel has the main portion constituted by a front cover 2 covering the front portion of the camera body 1, a rear cover 3 covering the rear portion of the same, and a back cover 4. The back cover 4 is fastened to the rear cover 3 by a hinge (omitted from illustration) as to be opened/closed and can be closed by a light shielding elastic member 5 while being hermetically shielded from light.

The zoom lens barrel comprises a drive cylinder 20, which serves as a cam drive frame and is used to control the movement and positioning of the lens groups 40, 50 and 60, to be more fully described, rotatably fitted to the outer surface of the fixed cylinder 10 and inhibited from movement in the direction of the optical axis, and a cam cylinder 30, which serves as a second cam drive frame fitted to the inner surface of the fixed cylinder 10, driven by the drive cylinder 20 and arranged to move forwards/rearwards in the direction of the optical axis while being rotated. The zoom lens barrel further comprises a first lens holding frame i.e. cylinder 40, a second lens holding frame i.e. cylinder 50, and a third lens holding frame i.e. cylinder 60, disposed sequentially in this order when viewed from the cam cylinder 30 and enabled to be moved forwards/rearwards in the direction of the optical axis, and a float key 80, also referred to as a movable member, similarly disposed in the cam cylinder 30, inhibited by a key receiving member 34 to moving only in the direction of the optical axis relative to cam cylinder 30, inhibited by the fixed cylinder 10 from rotating around the optical axis, and arranged to restrict the rotation of the first lens cylinder 40, the second lens cylinder 50 and the third lens cylinder 60 around the optical axis and hence key 80 is also referred to as a linear movement key. The zoom lens barrel further comprises a barrier unit 70 (see FIG. 1) disposed adjacent to the front surface of the first lens cylinder 40 and having a barrier 71 which is opened/closed by a barrier driver 53 (see FIG. 1) supported in the second lens cylinder 50. The zoom lens barrel further comprises a shutter blade 54 (see FIG. 1) which is opened/closed by a shutter unit 52 (see FIG. 1) supported in the second lens cylinder 50, and an elastic member 90 arranged between the second lens cylinder 50 and the third lens cylinder 60 and made of a coil spring for absorbing looseness of drive rollers 50a and 60a taking place with respect to cam grooves 30b and 30c to be described later. The zoom lens barrel further comprises a flare diaphragm 100 fastened to the rear portion of the float key 80.

The drive cylinder 20 has, on the outer surface thereof, a drive gear 21, a guide rib 22 and an interlocking cam 23 respectively formed into partial circular arcs and disposed in this sequential order from the forward position. The drive gear 21 receives drive force from a zooming drive unit (omitted from illustration) so as to rotate the drive cylinder 20 in counterclockwise direction (arrow A) or clockwise direction (arrow B) (see FIG. 2) around optical axis O while being guided by the guide rib 22. The interlocking cam 23 acts to zoom a lens of a finder optical system (omitted from illustration). The drive cylinder 20 has guiding means comprised of elongated grooves 20a formed in the outer surface thereof at trisectioned positions, the guiding grooves 20a extending in the direction of the optical axis. Moreover, the drive cylinder 20 comprises, at the rear end thereof, a cut portion 20b formed for allowing a date-printing light beam emitted by a data unit (omitted from illustration) to pass through. The ends of cut portion 20b are defined by projections 20d. Furthermore, an encoder 250 for detecting the quantity of rotation of the drive cylinder 20 is disposed at the rear end of the drive cylinder 20.

The fixed cylinder 10 has cam grooves 10a for moving the cam cylinder 30 in the forward/rearward direction of the optical axis while rotating the cam cylinder 30. As illustrated in FIG. 2, three cam grooves 10a are formed in the outer surface of cylinder 10, equidistant from each other. Furthermore, three linear-movement guide grooves 10b which receive a guiding follower projection 80a of the float key (i.e. linear movement key) 80 to be described later are formed at equal distances from each other when viewed in the circumferential direction, the linear-movement guide grooves 10b being formed in the inner surface of the fixed cylinder 10. Moreover, a rectangular through hole 10c elongated in the direction of the optical axis is, as shown in FIG. 2, formed in the rear end portion of the fixed cylinder 10 facing the surface of the film, the rectangular through hole 10c being formed adjacent to the end portion of a cam groove 10a among the aforesaid three cam grooves 10a which is positioned in the upper portion of the camera. At the time of the photographing operation, the cut portion 20b formed in the drive cylinder 20 superposes on the through hole 10c so as to pass through the date printing light beam emitted from the data unit (omitted from illustration) which is a data printing means. Moreover, a stopper projection 10d projecting over the outer surface of the fixed cylinder 10 is formed at a position adjacent to the through hole 10c and opposing the end portion of the cam groove 10a, the stopper projection 10d being arranged to restrict the rotation of the drive cylinder 20. It should be noted that fastening arm portions 10e so formed at the rear end portion of the fixed cylinder 10 as to project in the radial direction are fastening portions with which the fixed cylinder 10 is fastened to the camera body 1.

Figure 5:
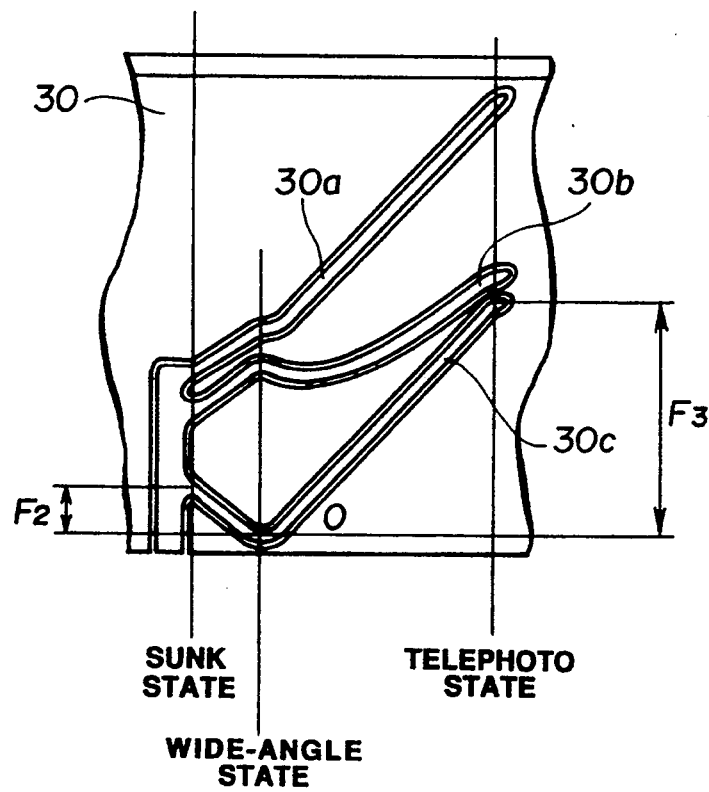
FIG. 5 is a plan view which illustrates cam grooves formed on the surface of a cam cylinder according to the first embodiment.

The cam cylinder 30 fitted within the fixed cylinder 10 has cam grooves 30a formed in the inner surface at trisectioned positions for the purpose of moving the first lens cylinder 40 in the direction of the optical axis in order to perform the zooming operation. Similarly, cam grooves 30b for moving the second lens cylinder 50 in the direction of the optical axis in order to perform the zooming operation, and cam grooves 30c for moving the third lens cylinder 60 in the direction of the optical axis in order to perform the zooming operation are respectively formed in the inner surface of the cam cylinder 30 at trisectioned positions. The state of each of the cam grooves 30a to 30c are illustrated in detail in FIG. 5. FIG. 5 illustrates a portion of the inner surface of the cam cylinder 30 in a planar manner. Referring to FIG. 5, symbol F2 represents a distance for which the third lens cylinder 60 is moved with respect to the float key 80 during transition of each lens group from the wide angle state (hereinafter called "state W") to a collapsed state, while symbol F3 represents a distance for which the third lens cylinder 60 is moved with respect to the float key 80 during transition of each lens group from the state W to the telephoto state (hereinafter called "state T").

Referring back FIG. 2, zooming drive rollers 32, which serve as cam followers, are, at trisectioned positions, respectively fixed to the outer surface of the cam cylinder 30 at the rear end portion by screws 33. The rollers 32 pass through the cam grooves 10a formed in the fixed cylinder 10 until they are received by the guiding elongated grooves 20a formed in the drive cylinder 20. As a result, when the drive cylinder 20 is rotated around optical axis O, also the zooming drive roller 32 is rotated by the guiding elongated groove 20a, causing the cam cylinder to be moved forwards/rearwards by the cam groove 10a while being rotated.

The first lens cylinder 40 includes a lens supporting frame 41 which holds a first lens group L1 (see FIG. 1) and which is fixed at a position in a relatively front portion thereof. Moreover, the first lens cylinder 40 has relatively wide guide grooves 40b formed in the inner surface thereof in the direction of the optical axis at trisectioned positions. The guide grooves 40b each receive the outer surface of a key portion 80b of a float key 80 to be described later so as to restrict the lens cylinder 40 to move in only the direction of the optical axis. Moreover, drive rollers 40a, which serve as cam followers are fixedly implanted in the outer surface of the rear end portion of the lens cylinder 40 at trisectioned positions, the drive rollers 40a being received by the cam grooves 30a formed in the cam cylinder 30.

A lens supporting frame 51, which holds a second lens group L2 (see FIG. 1), is secured to the inner surface of the second lens cylinder 50. Furthermore, relatively wide guiding cut portions 50e are formed in the circumferential direction of the outer surface of the second lens cylinder 50 at trisectioned positions. The guiding cut portions 50e are each arranged to receive the inner surface of a key portion 80b of the float key 80 to be received by the guide groove 40b, so that the movement of the lens cylinder 50 is restricted only in the direction of the optical axis. As a result, the key portion 80b of the float key 80 is held between the guide groove 40b and the guiding cut portion 50e. Moreover, drive rollers 50a; which serve as cam followers, are implanted in the rear portions of the outer surface of the second lens cylinder 50 between the guiding cut portions 50e. As a result, the drive rollers 50a are implanted at trisectioned positions in the rear portion of the outer surface of the lens cylinder 50 so as to be respectively received by an associated one of the cam grooves 30b formed in the cam cylinder 30.

As described above, the second lens cylinder 50 has the shutter unit 52 and the shutter blade 54 which are integrally moved forwards/rearwards together with the second lens cylinder 50.

The third lens cylinder 60 includes a lens supporting frame 61 which is secured to the inner surface thereof and which holds a third lens group L3 (see FIG. 1). Furthermore, relatively wide guiding cut portions 60b are formed in the circumferential direction of the outer surface of the third lens cylinder 60 at trisectioned positions. The guiding cut portions 60b are each arranged to receive a key portion 80b of the float key 80 disposed between the guide groove 40b and the guiding cut portion 50e, so that the movement of the lens cylinder 60 is restricted to only the direction of the optical axis. In addition, drive rollers 60a are implanted between the guiding cut portions 60b, which serve as cam followers, formed in the outer surface of the lens cylinder 60. Therefore, the drive rollers 60a are respectively implanted in the outer surface of the lens cylinder 60 at trisectioned positions, so that each drive roller 60a is received by the cam groove 30c formed in the cam cylinder 30.

Furthermore, an elastic member 90 made of a coil spring is arranged between the front surface of the third lens cylinder 60 and the rear surface of the second lens cylinder 50, the elastic member 90 acting to absorb looseness of the drive roller 50a received by the cam groove hole 30b and that of the drive roller 60a received by the cam groove hole 30c.

The float key 80 comprises an annular base portion 80c, the front portion of which is positioned on the inner surface of the rear end portion of the cam cylinder 30, the three key portions 80b extending forward from the trisectioned positions of the front surface of the annular base portion 80c, rectangular fitting holes 80e formed adjacent to the annular base portions 80c of the key portions 80b and elongated in the direction of the optical axis, and guiding projections 80a projecting over the outer surface of the annular base portion 80c at trisectioned positions so as to be received by the linear-movement guide grooves 10b formed in the fixed cylinder 10. The float key 80 is able to be moved in the direction of the optical axis together with the cam cylinder 30 but its rotation around the optical axis O is inhibited because of an arrangement so made that the rear end surface of its annular base portion 80c is simultaneously received by a key receiving portion 34 fixed by the screws 33 when the zooming drive rollers 32 are fixed to the outer surface of the rear end portion of the cam cylinder 30 at trisectioned positions. The three key portions 80b extending forward pass through the guiding portions 60b of the third lens cylinder 60, the guiding cut portions 50e of the second lens cylinder 50 and the guide grooves 40b of the first lens cylinder 40.

The flare diaphragm 100 (see FIG. 3) comprises an annular wall portion 100b formed around a thin plate, which has a flare diaphragm opening 100c formed at the central portion thereof, the annular wall portion 100b extending forward. The flare diaphragm 100 further comprises fitting members 100a extending forwards from the trisectioned positions of the front surface of the annular wall portion 100b, the fitting members 100a having elasticity. The flare diaphragm 100 further comprises fastening claws 100d formed on the outer surfaces of the leading portions of the fitting members 100a. The flare diaphragm 100 is fitted from the rear portion of the float key 80 along its inner surface while preventing an interference with the third lens cylinder 60 so as to cause the fastening claws 100d of the fitting members 100a to be elastically received by the rectangular fitting holes 80e formed in the float key 80. As a result, the flare diaphragm 100 is so fastened to the rear portion of the float key 80 as to be moved relative to float key 80 in the direction of the optical axis by a distance of the longitudinal length of fitting hole 80e.

As shown in FIG. 1, an "O" ring 11 is disposed between the inner surface of the leading portion of the front cover 2 and the outer surface of the leading portion of the fixed cylinder 10 for the purpose of shielding light and liquid. Similarly, elastic rings 12 and 31 are respectively disposed between the inner surface of the relatively front portion of the fixed cylinder 10 and the outer surface of the cam cylinder 10 and between the front surface of the cam cylinder 30 and the outer surface of the first lens cylinder 40 for the purpose of shielding light and liquid.

Figure 4:
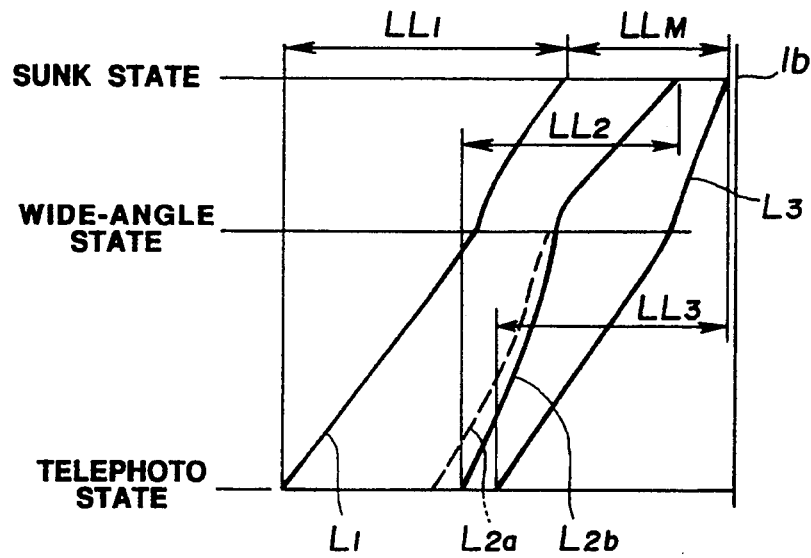
FIG. 4 is a graph which illustrates a state of movement of each lens group according to the first embodiment.

Then, the operation of the thus structured zoom lens barrel will now be described with reference to FIGS. 2 to 4. FIG. 4 is a graph which shows the movement of each lens group in the zoom lens barrel from the collapsed state to the telephoto state (hereinafter called "state T").

First, a zoom motor unit output gear (omitted from illustration) is allowed to engage with the drive gear 21, so that the drive cylinder 20 is rotated in direction A or B (see FIG. 2). Assuming that the drive cylinder 20 is rotated from the collapsed state in the direction A, the cam cylinder 30 is moved in the direction of optical axis C (see FIG. 2) while being rotated in the direction A due to the relationship between the guiding elongated groove hole 20a and the cam groove hole 10a. The float key 80, which can be rotated with respect to the cam cylinder 30 and which is integrally fastened to the same in the direction of the optical axis at this time, is linearly moved in the direction of the optical axis C in such a manner that it is not rotated due to the relationship between the linear-movement guide groove 10b and the guiding projections 80a. Furthermore, the first lens cylinder 40, the second lens cylinder 50 and the third lens cylinder 60 are not rotated but are moved linearly because the first lens cylinder 40, the second lens cylinder 50 and the third lens cylinder 60 are so structured as not to be rotated with respect to the float key 80 as described above.

As described above, the cam groove formed in the cam cylinder 30 is composed of the cam grooves 30a for the first lens group, the cam grooves 30b for the second lens group and the cam grooves 30c for the third lens group. The maximum movement quantities LL1, LL2 and LL3 of the lens groups synthesized by the cam grooves 30a, 30b and 30c and the cam groove holes 10a respectively are as shown in FIG. 4. The maximum movement quantities LL1, LL2 and LL3 respectively are the maximum movement quantities of the first lens group L1, the second lens group L2 and the third lens group L3. Referring to FIG. 4, symbols L1, L2a, L2b and L3 respectively represent the loci of movements of the lens groups, where L1 represents the locus of the first lens group, L2a and L2b represent the loci of the second lens group at the time of the nearest state and the infinite state, and L3 represent the locus of the third lens group. Referring to FIG. 4, symbol 1b represents the surface of the film and LLM represents the shortest length from the lens supporting frame 41 to the drive roller 60a.

While standardizing the float key 80, the cam cylinder 30 is only rotated, causing each lens group to be converted from the collapsed state to the state T as shown in FIG. 4.

If the output gear of the zoom motor unit is rotated reversely, the drive cylinder 20 is rotated in the direction B (see FIG. 2), resulting in each of the lens groups to be converted from the state T to the collapsed state as shown in FIG. 4.

It should be noted that the cut portion 20b formed in the drive cylinder 20 is allowed to engage with the stopper projection 10d formed on the fixed cylinder 10, so that the rotation of the drive cylinder 20 is restricted if the drive cylinder 20 is excessively collapsed and if the same is excessively converted from the state T toward the telephoto state.

Assuming that the maximum movement quantities of the lens groups respectively are LL1, LL2 and LL3 and the minimum length from the lens supporting frame 41 to the drive roller 60a is LLM as shown in FIG. 4, the overall length of the cam cylinder 30 can be made to be as follows:

about LL1/2+LLM

Furthermore, the overall length of the fixed cylinder at this time can be made to be as follows:

about LL1/2

Hence, the shortest length of the zoom lens barrel according to the first embodiment can be made to be as follows:

about LL1/2+LLM

Assuming that the structure of the conventional zoom lens barrel has the same structure as that according to the first embodiment, the shortest length of the conventional lens barrel is longer than the following value:

LL1+LLM

Therefore, the first embodiment enables a zoom lens barrel the overall length of which can be shortened to be provided.

Figure 6:
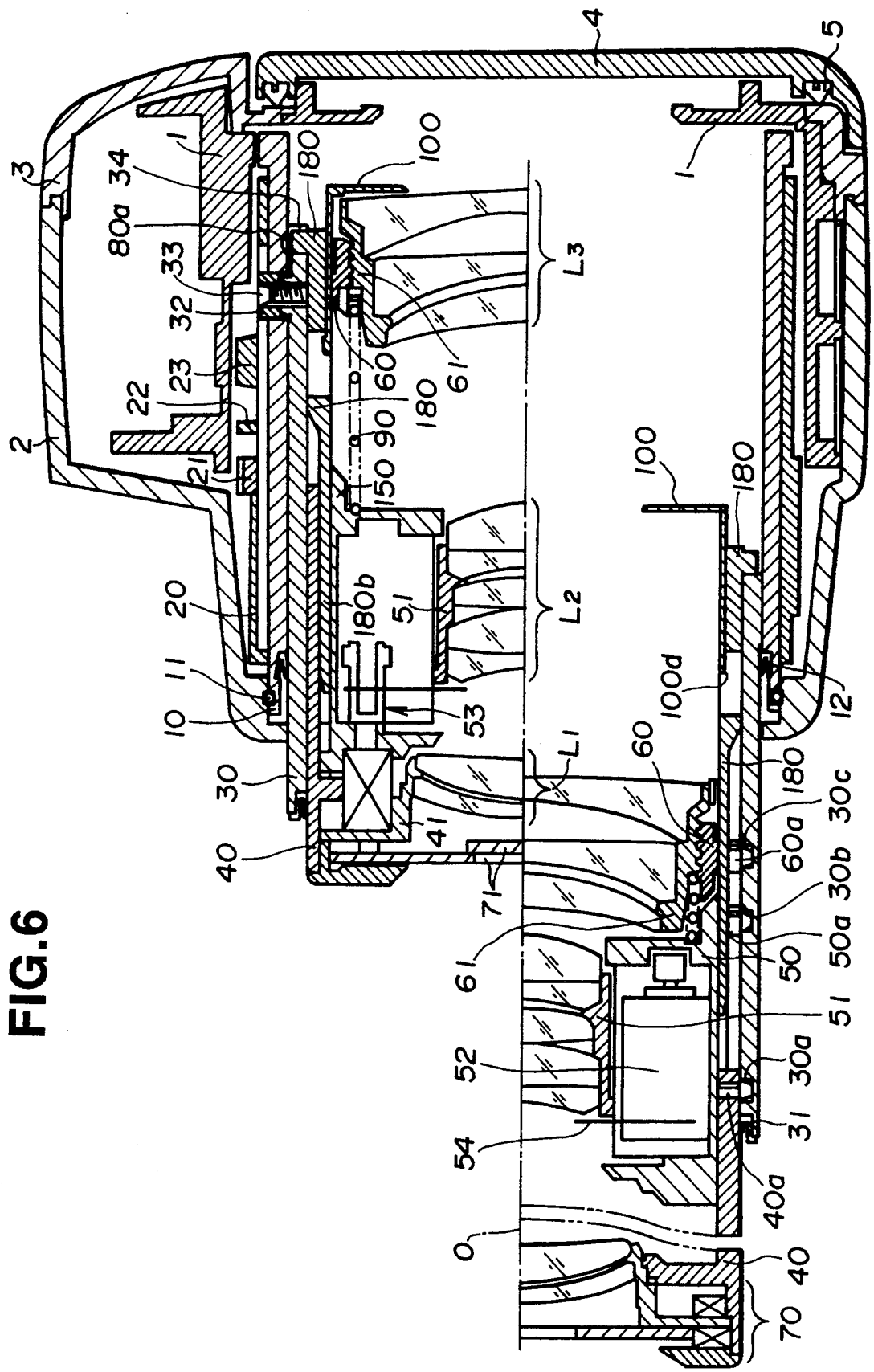
FIG. 6 is a cross sectional view which illustrates a second embodiment of a zoom lens barrel according to the present invention.

FIG. 6 is a cross sectional view which illustrates a zoom lens barrel according to a second embodiment of the present invention.

The basic structure of the second embodiment is similar to that of the aforesaid first embodiment but is different only in the shape of the second lens cylinder 50 and that of the float key 80 according to the first embodiment, which are partially changed. Therefore, the description will be made about only the changed portions.

Figure 7:
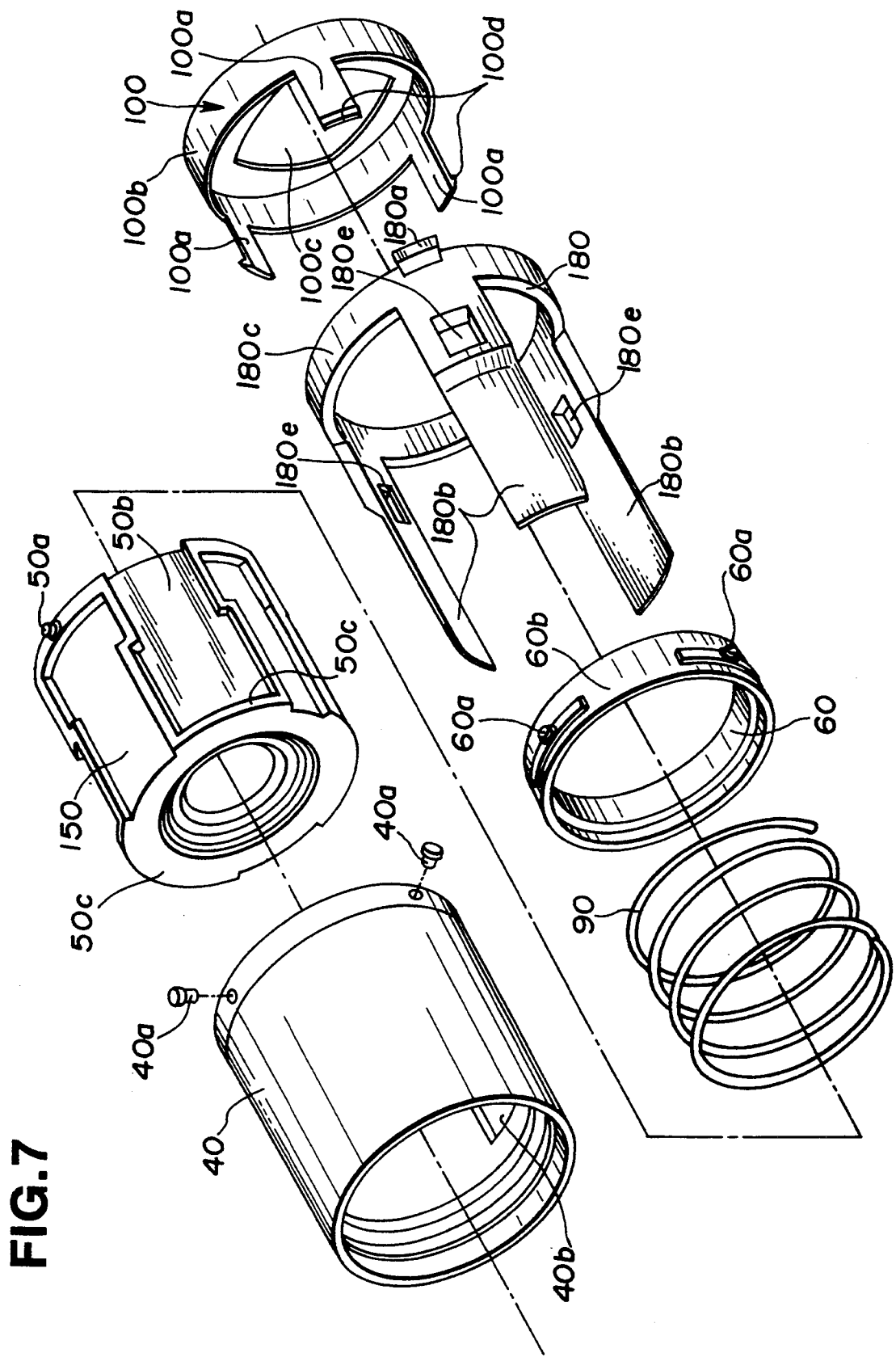
FIG. 7 is an exploded perspective view which illustrates elements of the second embodiment while elongating the elements in the direction of the optical axis.
Figure 8:
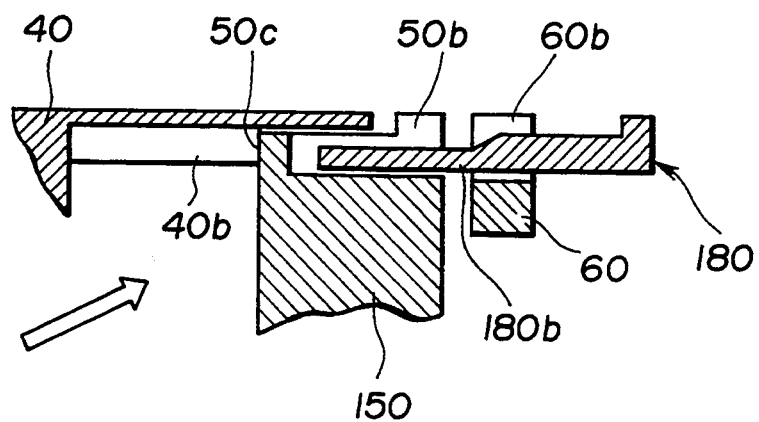
FIG. 8 is an enlarged cross sectional view which illustrates a second lens cylinder, a float key and their peripheral portion according to the second embodiment.

FIG. 7 is an exploded perspective view which illustrates a state in which elements of the zoom lens barrel according to this embodiment are spaced apart in the direction of the optical axis. According to this embodiment, the elements except for a second lens barrel 150 and a float key 180, are made to have shapes similar to those according to the first embodiment.

The second lens cylinder 150 includes the fixed lens supporting frame 51 which holds the second lens group L2 (see FIG. 6). Moreover, the second lens cylinder 150 has guiding recesses 50b formed in the outer surface thereof at trisectioned positions, the second lens cylinder 150 each having a front wall 50c, being arranged to have a relatively large width in the circumferential direction and having an opened end portion. The guiding recesses 50b receive the inner surfaces of key portions 180b of the float key 180 to be received by the guide grooves 40b (see FIG. 6) so as to restrict the lens cylinder 150 to be moved in only the direction of the optical axis. Hence, the key portions 180b of the float key 180 are held between the guide grooves 40b and the guiding recesses 50b. Furthermore, drive rollers 50a are implanted in the rear portion between the guiding recesses 50b formed in the outer surface of the second lens cylinder 150. Therefore, the drive rollers 50a are respectively implanted in on the outer surface of the rear end portion of the lens cylinder 150 at the trisectioned positions, each of the driving rollers 50a being received by an associated cam groove 30b (see FIG. 6) formed in the cam cylinder 30.

It should be noted that the second lens cylinder 150 has the shutter unit 52 and the shutter blade 54 similar to the first embodiment so as to be moved forwards/rearwards integrally with the second lens cylinder 150.

The lens barrel structured as described above and according to the second embodiment of the present invention is operated similar to the first embodiment, and therefore its description is omitted here.

According to the second embodiment of the present invention, an effect can be obtained in that introduction of outside light into the lens barrel can be prevented by the front wall 50c disposed on the second lens cylinder 150 so that light leakage to the surface of the film can be prevented in addition to the effect of the first embodiment that the overall length of the lens barrel can be shortened.

Then, a third embodiment of the present invention will now be described.

Figure 9:
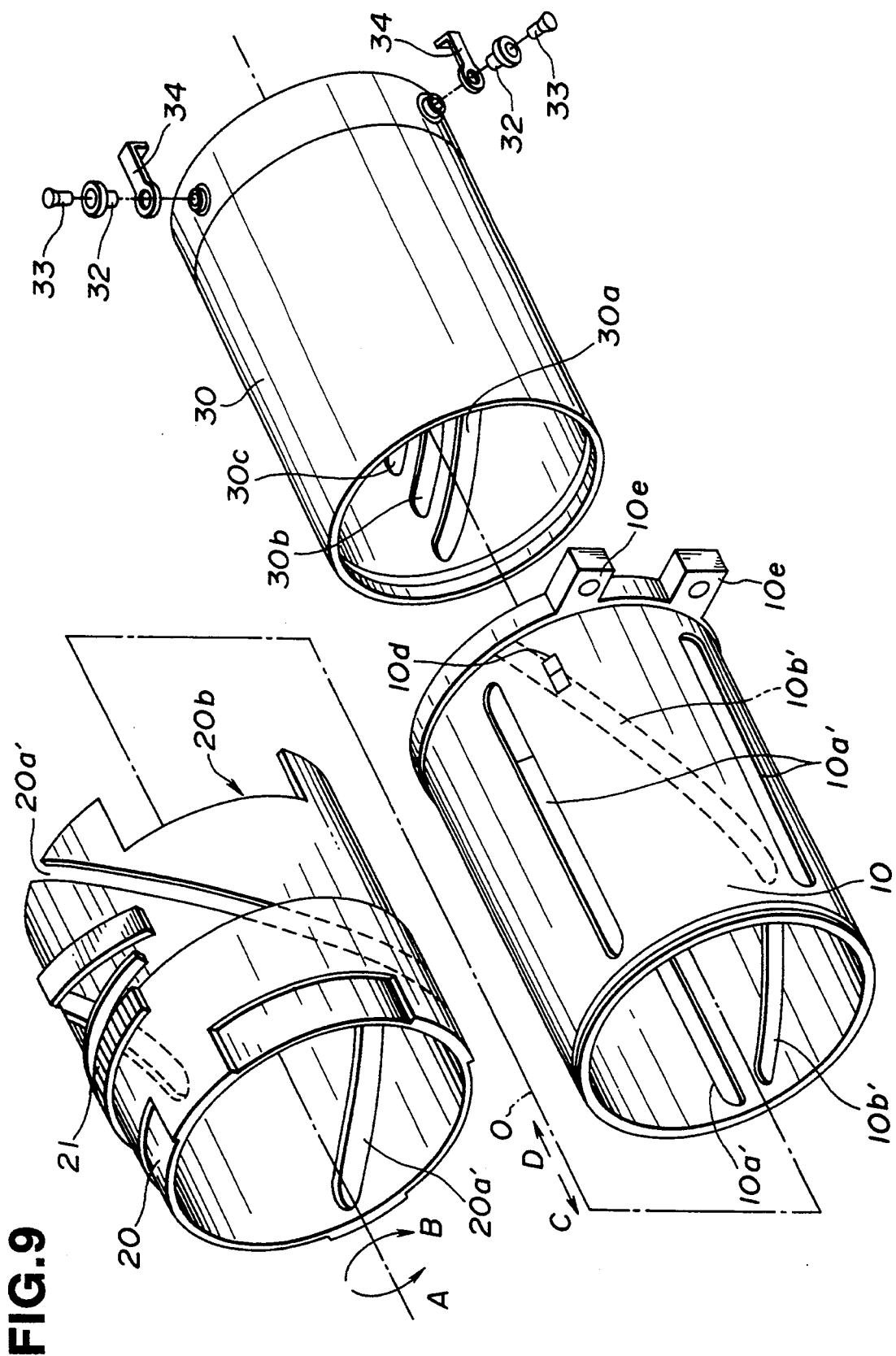
FIG. 9 is an exploded perspective view which illustrates elements of a third embodiment while elongating the elements in the direction of the optical axis.
Figure 10:
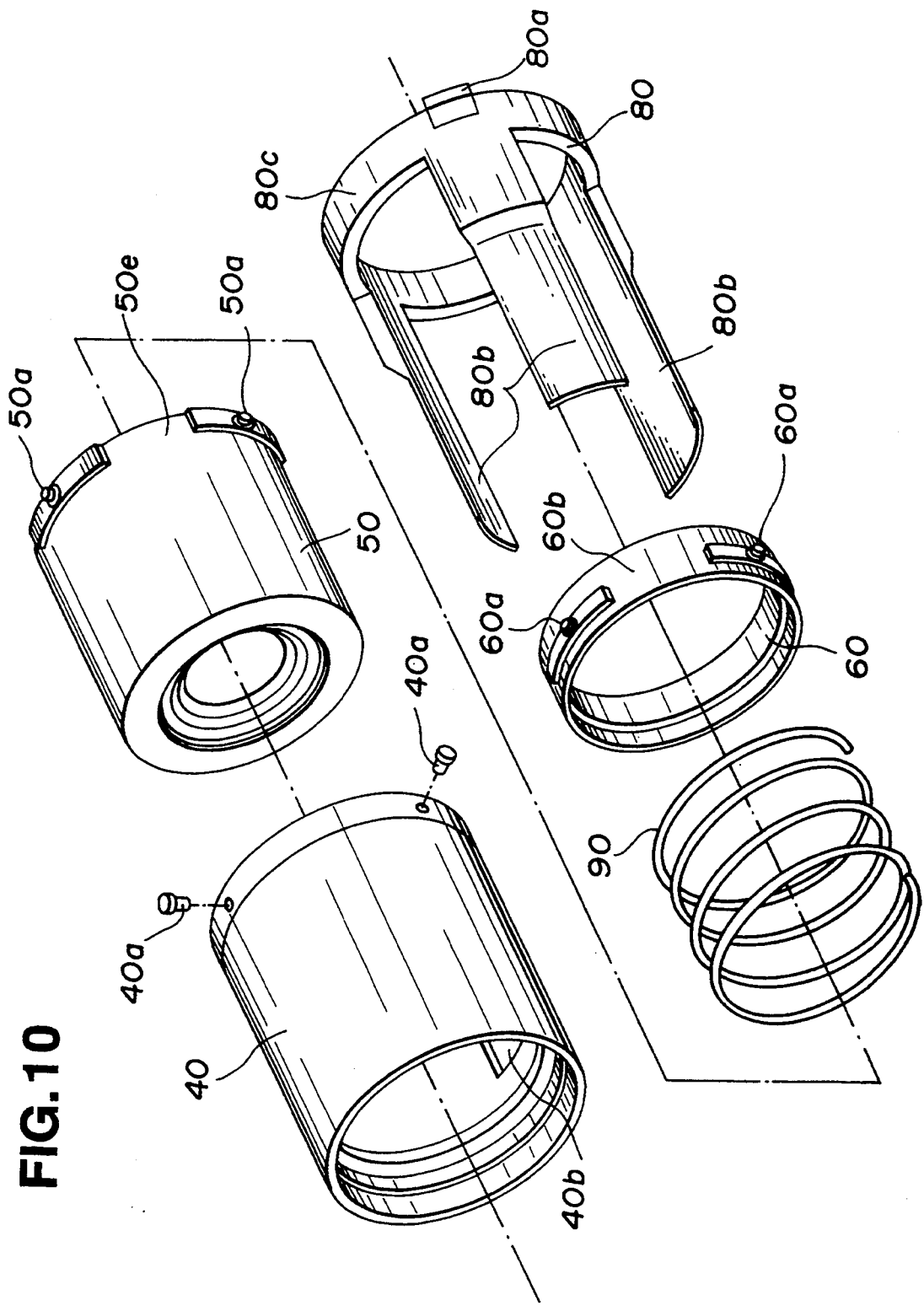
FIG. 10 is an exploded perspective view which illustrates elements of the third embodiment while elongating the elements in the direction of the optical axis.

FIGS. 9 and 10 are exploded perspective views which illustrate elements of a zoom lens barrel according to the third embodiment of the present invention while lengthening them in the direction of the optical axis.

The zoom lens according to the third embodiment has the drive cylinder 20 which is disposed around the fixed cylinder 10 fixed to the body of the camera (omitted from illustration) by arm portions 10e.

Moreover, a cam cylinder 30 is inserted into the fixed cylinder 10. The fixed cylinder 10 has a first linear-movement cam groove 10a' extending in the direction of the optical axis, while the drive cylinder 20 has a third cam groove 20a' formed diagonally. Furthermore, zooming drive roller 32 fixed to the outer surface of the cam cylinder 30 is structured so as to be received by both first linear-movement cam groove 10a' and the third cam groove 20a'.

The cam cylinder 30 includes the first lens cylinder 40, the second lens cylinder 50 and the third lens cylinder 60 respectively holding corresponding lens groups (omitted from illustration). Furthermore, the float key 80, which is a movable linear-movement member, is disposed at the rear end portion of the cam cylinder 30, the float key 80 being stationary in the direction of the optical axis with respect to the cam cylinder 30 but being moveable around the optical axis by the key receiving members 34 secured to the cam cylinder 30 together with the zooming drive rollers 32 by screws 33.

Moreover, the first lens group 40 has the drive rollers 40a which are received by a fourth cam groove 30a formed in the inner surface of the cam cylinder 30. The first lens cylinder 40 has a guide groove 40b formed therein and receiving the key portion 80b first extending from the annular base portion 80c of the float key 80 in the direction of the optical axis. That is, the first lens cylinder 40 cannot be moved around the optical axis with respect to the float key 80.

Similarly, the drive rollers 50a projecting over central step portions formed on the outer surface of the second lens cylinder 50 are received by a fifth cam groove 30b formed in the inner surface of the cam cylinder 30 and as well as the guiding cut portions 50e formed between the central step portions and the key portions 80b engage with one another. Therefore, the second lens cylinder 50 and the float key 80 cannot be moved around the optical axis.

The third lens cylinder 60 and the float key 80 are arranged to have a similar relationship, so that the third lens cylinder 60 cannot be moved around the axis of the optical axis with respect to the float key 80.

It should be noted that a coil spring 90 is arranged between the second lens cylinder 50 and the third lens cylinder 60, so that looseness of the second lens cylinder 50 and that of the third lens cylinder 60 with respect to the cam cylinder 30 can be significantly prevented.

The guiding projection 80a formed on the outer surface of the annular base portion 80c is received by the diagonal second cam groove 10b' formed in the inner surface of the fixed cylinder 10.

Then, the operation of the thus constituted third embodiment will now be described.

First, a zoom drive unit (omitted from illustration) is actuated, and the output gear of this unit transmits drive force to the drive gear 21 formed on the drive cylinder 20 and engaged to the output gear. Assuming that the drive cylinder 20 is rotated in a direction designated by an arrow A, the cam cylinder 30 is moved to the left along the optical axis O when viewed in FIG. 9 due to the relationship among the third cam grove 20a' the first linear-movement cam groove 10a' and the zooming drive rollers 32. At this time, the float key 80 rotatively fastened to the cam cylinder 30 is moved to the left along the optical axis by the same distance as that of the cam cylinder 30 due to the relationship between the guiding projection 80a and the cam groove 10b', and as well as rotated around the optical axis by an angle restricted by the first linear-movement cam groove 10a'.

That is, the float key 80 is relatively rotated with respect to the cam cylinder 30. As a result of the rotation performed by a predetermined quantity, also the first lens cylinder 40, the second lens cylinder 50 and the third lens cylinder 60 are rotated with respect to the cam cylinder 30 by the same quantity as that of the float key 80. Therefore, the first lens cylinder 40, the second lens cylinder 50 and the third lens cylinder 60 are moved in the direction of the optical axis by proper quantities with respect to the cam cylinder 30 due to the relationship between the fourth cam groove 30a, the fifth cam groove 30b, the sixth cam groove 30c and the drive rollers 40a, 50a and 60a.

That is, the rotation of the drive cylinder 20 around the optical axis causes the cam cylinder 30 to linearly move in the direction of the optical axis, and causes the first lens cylinder 40, the second lens cylinder 50 and the third lens cylinder 60 to be moved in the direction of the optical axis while being rotated around the optical axis. As a result, a predetermined zooming state is realized. When the zoom drive unit (omitted from illustration) is rotated in the opposite direction to the aforesaid direction and therefore the drive cylinder 20 is rotated in a direction designated by an arrow B, the aforesaid units are moved in a direction opposing the aforesaid direction.

Then, a fourth embodiment of the present invention will now be described.

Figure 11:
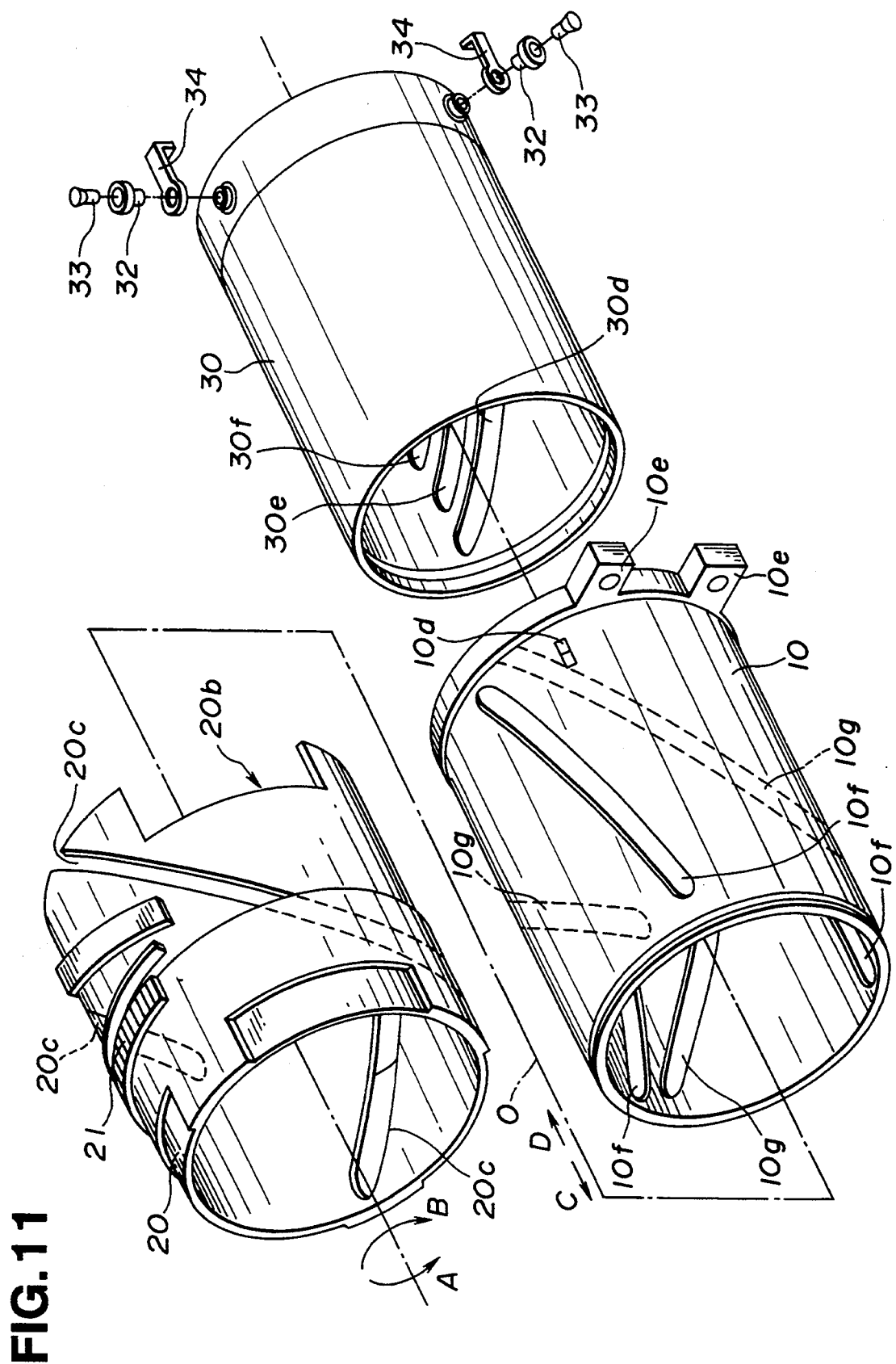
FIG. 11 is an exploded perspective view which illustrates elements of a fourth embodiment while elongating the elements in the direction of the optical axis.
Figure 12:
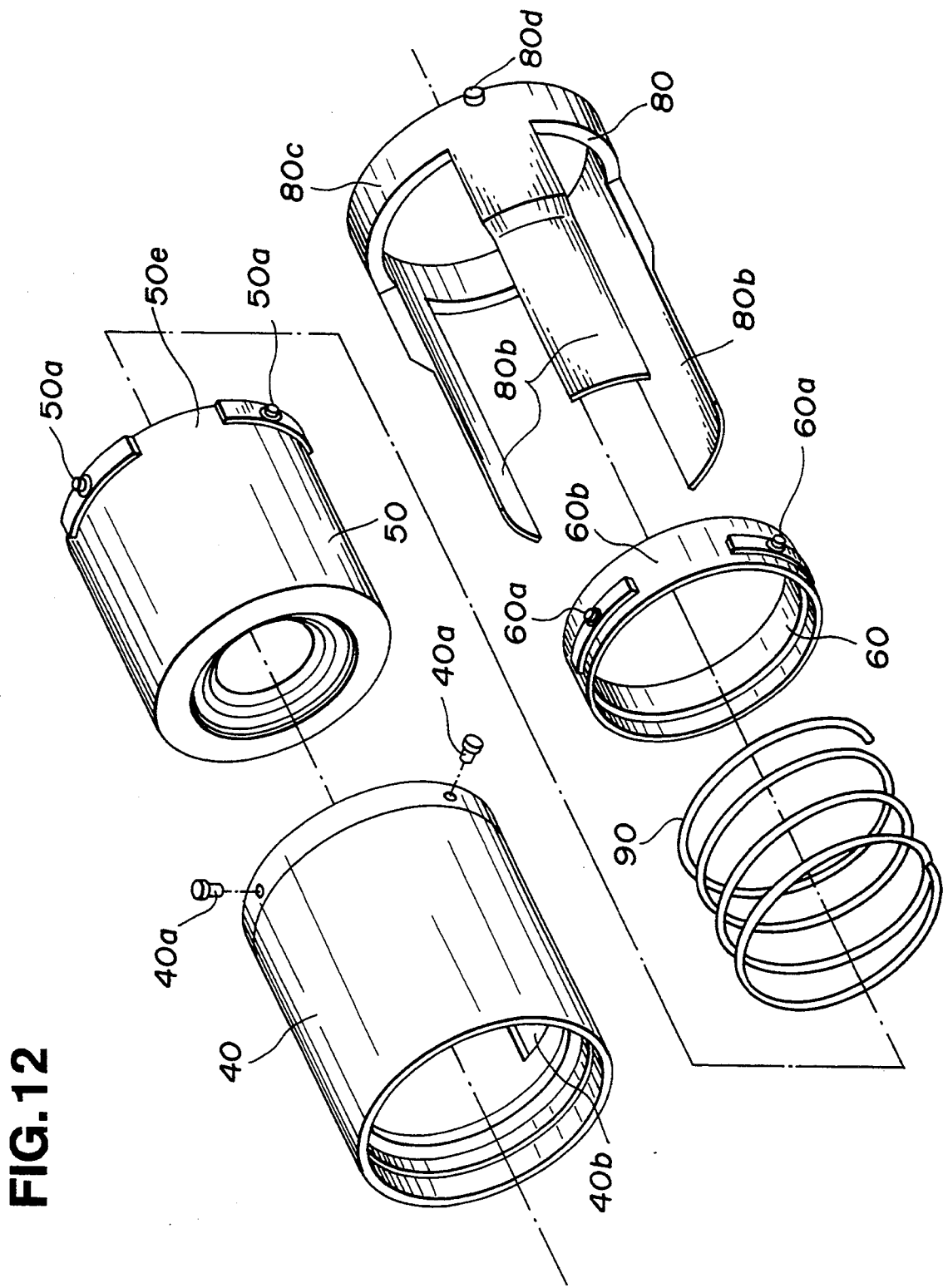
FIG. 12 is an exploded perspective view which illustrates elements of a fourth embodiment while elongating the elements in the direction of the optical axis.
Figure 13:
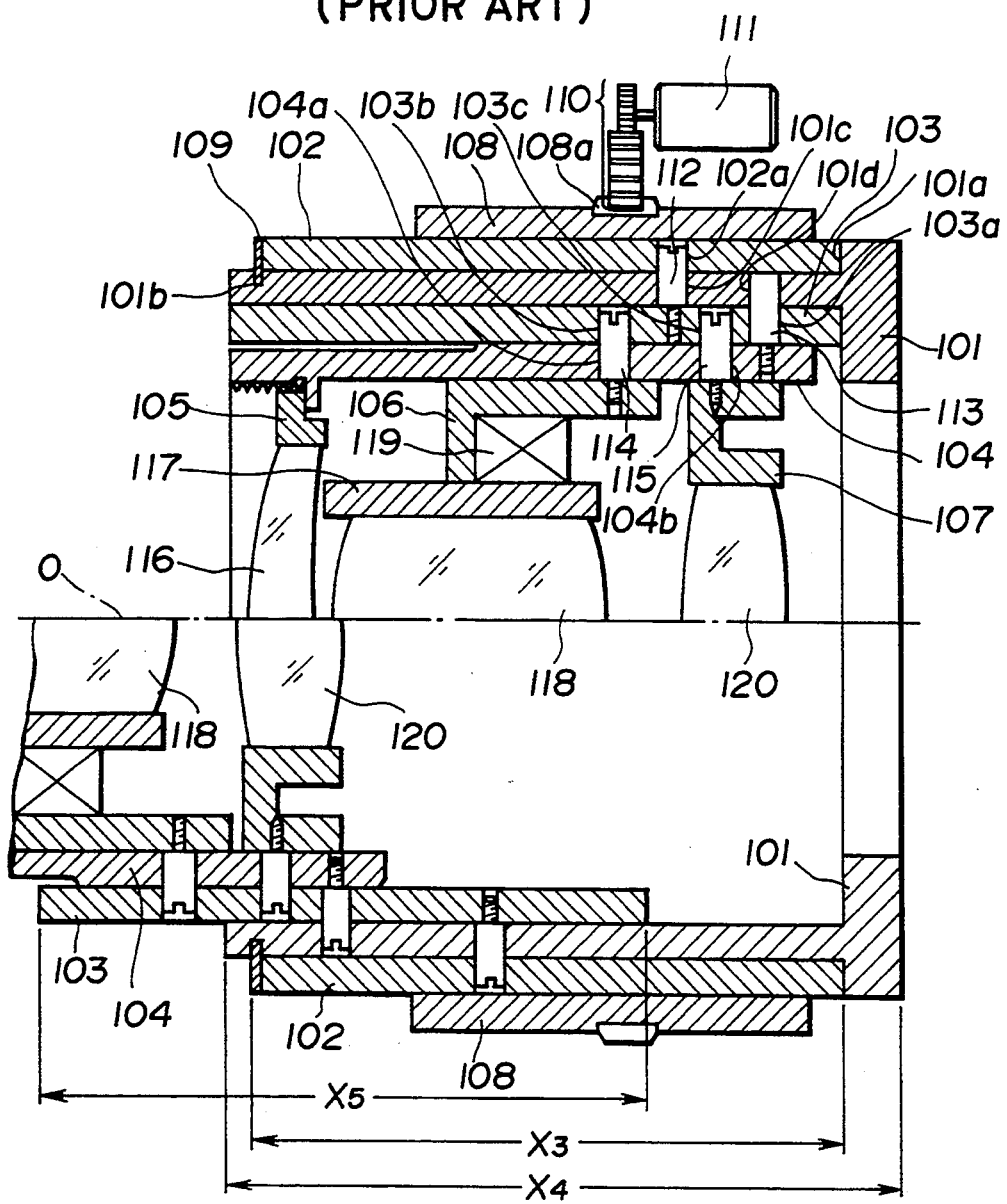
FIG. 13 is a cross sectional view which illustrates a conventional zoom lens barrel.

FIGS. 11 and 12 are exploded perspective views which illustrates elements of a zoom lens barrel according to the fourth embodiment of the present invention in such a way that they are elongated in the direction of the optical axis.

Although the aforesaid third embodiment is arranged in such a manner that the cam cylinder is linearly moved with respect to the fixed cylinder in the direction of the optical axis, the fourth embodiment is different in that the cam cylinder is moved while being rotated around the optical axis.

The lens barrel according to the fourth embodiment is arranged in such a way that the drive cylinder 20 is rotatably disposed around the fixed cylinder 10 fixed to the body of the camera (omitted from illustration) by the fastening arm portions 10e.

Furthermore, the cam cylinder 30 is held on the inside of the fixed cylinder 10. The fixed cylinder 10 has a first linear-movement cam groove 10f extending in the direction of the optical axis, while the drive cylinder 20 has a diagonal third cam groove 20c. The zooming drive rollers 32 fixed to the outer surface of the cam cylinder 30 are arrange to be received by both first linear-movement cam groove 10f and third cam groove 20c.

The first lens cylinder 40, the second lens cylinder 50 and the third lens cylinder 60 respectively holding lens groups (omitted from illustration) are disposed in the aforesaid cam cylinder 30. The float key 80, which is a movable linear-movement member, is disposed at the rear end portion of the cam cylinder 30, the float key 80 being unable to move in the direction of the optical axis with respect to the cam cylinder but is movable around the optical axis by the key receiving members 34, together with the zooming drive rollers 32, fixed to the cam cylinder 30 by the screws 33.

Furthermore, the first lens cylinder 40 has the drive rollers 40a which are received by the fourth cam groove 30d formed in the inner surface of the cam cylinder 30. Furthermore, the guide groove 40b is formed in the inner surface of the first lens cylinder 40 so as to be engaged with the key portion 80b integrally extending in the direction of the optical axis from the annular base portion 80c of the float key 80. That is, the first lens cylinder 40 cannot be moved with respect to the float key around the optical axis.

Similarly, the drive rollers 50a projecting over central step portions formed on the outer surface of the second lens cylinder 50 are received by the fifth cam groove 30e formed in the inner surface of the cam cylinder 30 and as well as the guiding cut portions 50e formed between the central step portions and the key portions 80b engage with one another. Therefore, the second lens cylinder 50 and the float key 80 cannot be moved around the optical axis.

The third lens cylinder 60 and the float key 80 are arranged to have a similar relationship, so that the third lens cylinder 60 cannot be moved around the optical axis O with respect to the float key 80.

It should be noted that the coil spring 90 is arranged between the second lens cylinder 50 and the third lens cylinder 60, so that looseness of the second lens cylinder 50 and that of the third lens cylinder 60 with respect to the cam cylinder 30 can be significantly prevented.

The guiding projection 80d formed on the outer surface of the annular base portion 80c is received by a diagonal second cam groove 10g formed in the inner surface of the fixed cylinder 10.

Then, the operation of the thus constituted fourth embodiment will now be described.

First, a zoom drive unit (omitted from illustration) is actuated, and the output gear of this unit transmits drive force to the drive gear 21 formed on the drive cylinder 20 and engaged with the output gear. When the drive cylinder 20 is rotated in a direction designated by an arrow A, the cam cylinder 30 is moved to the left along the optical axis when viewed in FIG. 11 due to the relationship among the third cam grove 20c, the first linear-movement cam groove 10f and the zooming drive rollers 32. At this time, the float key 80 rotatably fastened to the cam cylinder 30 is moved to the left of the optical axis by the same amount as that of the cam cylinder 30 due to the relationship between the guiding projection 80d and the cam groove 10g, and as well as rotated around the optical axis by a quantity restricted by the second linear-movement cam groove 10g.

That is, the float key 80 is relatively rotated with respect to the cam cylinder 30. As a result of the rotation performed by a predetermined quantity, also the first lens cylinder 40, the second lens cylinder 50 and the third lens cylinder 60 are rotated with respect to the cam cylinder 30 by the same quantity as that of the float key 80. Therefore, the first lens cylinder 40, the second lens cylinder 50 and the third lens cylinder 60 are moved in the direction of the optical axis by proper quantities with respect to the cam cylinder 30 due to the relationship between the fourth cam groove 30d, a fifth cam groove 30e, a sixth cam groove 30f and the drive rollers 40a, 50a and 60a.

That is, the rotation of the drive cylinder 20 around the optical axis causes the cam cylinder 30 to move in the direction of the optical axis while being rotated, and causes the first lens cylinder 40, the second lens cylinder 50 and the third lens cylinder 60 to be moved in the direction of the optical axis while being rotated around the optical axis. As a result, a predetermined zooming state is realized. When the zoom drive unit (omitted from illustration) is rotated in the opposite direction to the aforesaid direction and therefore the drive cylinder 20 is rotated in a direction designated by an arrow B, the aforesaid units are moved in a direction opposing the aforesaid direction.

Although the fourth embodiment and the third embodiment are different from each other in the shape of the guiding projections formed in the annular base portion 80c, it is apparent that a similar effect can be obtained from either of the aforesaid embodiments.

Although both the third embodiment and the fourth embodiment are arranged in such a manner that the cam cylinder 30 is moved in the direction of the optical axis by rotating the drive cylinder 20 formed on the outer surface of the fixed cylinder 10, the present invention is not limited to this. It is apparent that any structure may be employed if the cam cylinder 30 is able to move with respect to the fixed cylinder 10. Therefore, the drive cylinder 20 is not the essential portion of this embodiment.

Although the aforesaid embodiments describe a zoom lens barrel, the present invention is not limited to an ordinary zoom lens barrel but the aforesaid effect can be obtained when adapted to a lens barrel which enables the lens to be moved forward by a large quantity.

According to each embodiment of the present invention, the outer diameter of the zoom lens barrel can be reduced together with reductions of the outer diameter of each lens holding cylinder. Moreover, the quantity of the forward/rearward movement of each lens holding cylinder with respect to the fixed cylinder in the direction of the optical axis can be maximized. Furthermore, the overall length of the cam groove for each lens holding cylinder formed in the cam cylinder can be shortened. Consequently, a zoom lens barrel, the overall length of which can be shortened, can be provided which is adapted to a camera exhibiting a large magnification and having a zoom lens which is moved by a large quantity or a camera in which a lens is moved forwards by a large quantity.

In this invention, it is apparent that working modes different in a wide range can be formed on this basis of this invention without departing from the spirit and scope of the invention. This invention is not restricted by any specific embodiment except as limited by the appended claims.

What is claimed is:

1. A lens barrel comprising:
   a fixed frame fixed to a camera body;
   a first cam frame disposed on an outer surface of said fixed frame and rotatable around an optical axis;
   a second cam frame disposed in said fixed frame, arranged to be rotated around the optical axis with respect to said fixed frame due to rotation of said first cam frame with respect to said fixed frame;
   a movable member coupled with said second came frame and rotatable around the optical axis in such a manner that rotation of said movable member around the optical axis with respect to said fixed frame is restricted and said movable member has a linear-movement key extending in the direction of the optical axis;
   a first lens holding frame, disposed in said second cam frame and said movable member, and slidably engaging an inner surface of said second cam frame, slidably engaging an inner surface of said linear-movement key of said movable member, and arranged to move forward/rearward in a direction of the optical axis with respect to said second cam frame due to rotation of said second cam frame with respect to said fixed frame; and
   a second lens holding frame slidably engaging an outer surface of said linear-movement key and arranged to move forward/rearward in a direction of the optical axis with respect to said second cam frame due to rotation of said second cam frame with respect to said fixed frame.

2. A lens barrel according to claim 1, wherein said first lens holding frame and said second lens holding frame are arranged to move forward/rearward in the direction of the optical axis with respect to said second cam frame due to a cooperative action of said second cam frame and said movable member.

3. A lens barrel according to claim 1, wherein said movable member is provided with a follower projection extending into a linear-movement groove formed in an inner surface of said fixed frame and receiving said follower projection extending from said movable member.

4. A lens barrel according to claim 1, wherein said first lens holding frame and said second lens holding frame engage said movable member at spaced intervals about the optical axis and are aligned with the optical axis with respect to said fixed frame.

5. A lens barrel comprising:
   a fixed frame fixed to a camera body;
   a first cam frame rotatably disposed with respect to said fixed frame around an optical axis;
   a second cam frame arranged to be moved forward/rearward in a direction of the optical axis with respect to said fixed frame due to rotation of said first cam frame around the optical axis with respect to said fixed frame;

a movable member coupled with said second cam frame for movement in a direction of the optical axis and rotatable around the optical axis in such a manner that rotation of said movable member around the optical axis with respect to said fixed frame is restricted by linear movement means, said movable member having a linear-movement key extending in a direction of the optical axis; and at least one lens holding frame extending into said movable member and arranged to move forward/rearward in a direction of the optical axis with respect to said second cam frame due to rotation of said second cam frame with respect to said fixed frame.

6. A lens barrel according to claim 5, wherein said first cam frame is fitted to an outer surface of said fixed frame and said second cam frame is fitted to an inner surface of said fixed frame.

7. A lens barrel according to claim 5, wherein said key of said movable member is fitted against an inner surface of said second cam frame.

8. A lens barrel according to claim 5, wherein said one lens holding frame is movable forward/rearward in a direction of the optical axis with respect to said second cam frame due to a cooperative action of said second cam frame and said movable member.

9. A lens barrel according to claim 5, wherein said movable member is guided by said fixed frame by a linear-movement groove formed in an inner surface of said fixed frame and receiving a follower projection extending from said movable member.

10. A lens barrel according to claim 5, wherein said movable member is moved forward/rearward together with said second cam frame in a direction of the optical axis.

11. A lens barrel according to claim 5, wherein said one lens holding frame engages said movable member to be guided by said movable member along the optical axis.

12. A lens barrel according to claim 5, wherein said second cam frame is rotated around the optical axis with respect to said fixed frame due to its forward/rearward movement in the direction of the optical axis with respect to said fixed frame.

13. A lens barrel comprising:
a fixed frame fixed to a camera body;
a cam frame disposed in said fixed frame and moved forward/rearward along an optical axis with respect to said fixed frame;
a movable member coupled to move with said cam frame in a direction of the optical axis and rotatable around the optical axis, and arranged to be rotated with respect to said cam frame due to forward/rearward movement of said cam frame in a direction of the optical axis with respect to said fixed frame and having a linear-movement key extending in a direction of the optical axis; and
at least one lens holding frame disposed in said cam frame to be guided by said movable member along the optical axis, and engaging said cam frame and said linear-movement key of said movable member, and arranged to move forward/rearward along the optical axis with respect to said cam frame due to rotation of said movable member with respect to said cam frame.

14. A lens barrel comprising:
a fixed frame fixed to a camera body;
a first cam frame disposed on an outer surface of said fixed frame and rotatable around an optical axis;
a second cam frame disposed in said fixed frame and arranged to be moved forward/rearward along the optical axis with respect to said fixed frame due to rotation of said first cam frame with respect to said fixed frame;
a movable member coupled to move with said second cam frame in a direction of the optical axis and rotatable around the optical axis, and arranged to be rotated with respect to said second cam frame and said fixed frame due to forward/rearward movement of said second cam, and having a linear-movement key extending in a direction of the optical axis; and
at least one lens holding frame disposed in said cam frame and guided by said movable member along the optical axis, and engaging said second cam frame on an outer surface thereof and engaging said key of said movable member on an inner surface thereof, and arranged to move forward/rearward along the optical axis with respect to said second cam frame due to rotation thereof with respect to said second cam frame.

15. A lens barrel according to claim 14, wherein said one lens holding frame is moved in a direction of the optical axis with respect to said second cam frame due to a cooperative action of said second cam frame and said movable member.

16. A lens barrel according to claim 14, wherein said movable member is rotated around the optical axis with respect to said fixed frame by a cam groove formed in an inner surface of said fixed frame and receiving a projection extending from said movable member.

17. A lens barrel according to claim 14, wherein said lens holding frame engages said movable member at spaced intervals around the optical axis so as to be moved forward/rearward along the optical axis with respect to said fixed frame.

18. A lens barrel comprising:
a fixed frame fixed to a camera;
a first cam frame disposed on an outer surface of said fixed frame and rotatable around an optical axis;
a second cam frame disposed in said fixed frame and movable in a direction of the optical axis with respect to said fixed frame due to rotation of said first cam frame with respect to said fixed frame;
a movable member coupled with said second cam frame to move in the direction of the optical axis and rotatable around the optical axis and having an elongated guide portion extending in a direction of the optical axis; and
lens holding frames disposed in said second cam frame, having cam followers engaging cams provided in said second cam frame, and guided by said movable member along the optical axis due to engagement with said guide portion of said movable member, and arranged to be moved forward/rearward along the optical axis with respect to said second cam frame due to a cooperative action of said fixed frame and said second cam frame.

19. A lens barrel according to claim 18, wherein one of said lens holding frames disposed at a leading portion of said lens barrel is arranged to expose an outer surface thereof when said one lens holding frame is moved in a forward direction along the optical axis.

20. A lens barrel according to claim 18, wherein a cam groove is formed in an inner surface of said second cam frame, said groove having a bottom.

21. A lens barrel comprising:
a fixed frame fixed to a camera;
a first cam frame disposed on said fixed frame as to be rotatable around an optical axis;
a second cam frame disposed in said fixed frame and rotatable around the optical axis with respect to said fixed frame and moved forward/rearward along the optical axis due to rotation of said first cam frame with respect to said fixed frame;
a movable member coupled to move with said second cam frame in the direction of the optical axis and rotatable around the optical axis and having a guide portion extending in a direction of the optical axis; and
a lens holding frame disposed in said second cam frame, having a cam follower engaging said second cam frame, guided by said movable member at spaced intervals around the optical axis due to engagement with said guide portion of said movable member on an inner surface thereof, and arranged to be moved forward/rearward along the optical axis with respect to said second cam frame due to relative rotation between said second cam frame and said fixed frame.

22. A lens barrel comprising:
a lens holding frame for holding a lens and being exposed outside a camera, said lens holding frame having a cam follower and a cam on the inner surface thereof;
a fixed frame having a diagonal cam disposed diagonally with respect to an optical axis and a parallel cam running parallel to the optical axis;
a first rotatable cam ring rotatably engaging an outer surface of said fixed frame and having a parallel cam extending parallel to the optical axis;
a second cam ring fitted to an inner surface of said fixed frame in such a manner that said second cam ring is rotatable and movable forward/rearward in a direction of the optical axis, and having a cam follower which engages with said diagonal cam of said fixed frame and said parallel cam of said first cam ring, and having, on an inner surface thereof, a diagonal cam groove for forwardly/rearwardly moving said lens holding frame in a direction of the optical axis, said diagonal cam groove being disposed diagonally with respect to the optical axis; and
a moveable member engaging an inner surface of said second cam ring, coupled to be moved forward/rearward together with said second cam ring in a direction of the optical axis, and having a follower projection engaging said parallel cam of said fixed frame to prevent rotation of said moveable member, and having a guide key portion for guiding said lens holding frame in a direction of the optical axis; wherein
said second cam ring and said movable member being moved forward/rearward along the optical axis and said lens holding frame being moved forward/rearward in a direction of the optical axis when said lens holding frame is guided by said guide portion of said movable member, said cam follower of said lens holding frame engaging said diagonal cam of said second cam ring in order to move forward/rearward along the optical axis when said first cam ring is rotated around the optical axis.

23. A zoom lens comprising:
a lens holding frame arranged to hold a lens, exposed outside of a camera and having a cam on an inner surface thereof;
means for controlling forward/rearward movement of said lens holding frame along an optical axis; and
a movable member having elongated key means which guides said lens holding frame in such a manner that said lens holding frame is able to move forward/rearward along the optical axis with respect to said movable member and is prevented from being rotated around the optical axis, and having a follower projection which engages with a cam on an inner surface of said lens holding frame, said movable member further being arranged in such a manner to move forward/rearward by said means for controlling and that it cannot rotate around the optical axis.

24. A zoom lens according to claim 23, wherein said means for controlling comprises a fixed frame and a plurality of cam rings each of which is rotatably fitted to said fixed frame.

25. A zoom lens comprising:
a lens holding frame arranged to hold a lens and being exposed outside a camera;
means for controlling forward/rearward movement said lens holding frame in a direction of an optical axis; and
a movable member which moves forward/rearward along the optical axis by said means for controlling in such a manner that rotation of said movable member is inhibited so as to further move forward/rearward said lens holding frame, which is guided by a key means of said moveable member, only in the direction of the optical axis.

26. A zoom lens according to claim 25, wherein said means for controlling is composed of a fixed frame and a plurality of cam rings each of which is engages said fixed frame and is rotatable about said optical axis.

27. A lens barrel comprising:
a holding frame arranged to hold a lens and being exposed outside a camera;
key guide means engaging an inner surface of said lens holding frame so as to limit movement forward/rearward of said lens holding frame in only the direction of an optical axis while preventing rotation of said lens holding frame; and
means for moving said guide means forward/rearward and said lens holding frame in the direction of the optical axis.

28. A lens barrel according to claim 27, wherein said means for moving comprises a fixed frame and a plurality of cam rings which engage said fixed frame and are rotatable about the optical axis.

29. A zoom lens comprising:
a fixed frame;
a first cam frame engaging an outer surface of said fixed frame and rotatable around an optical axis;
a second cam frame engaging an inner surface of said fixed frame and rotatable around the optical axis;
a movable member rotatable relative to said second cam frame, formed integrally with said second cam in the direction of the optical axis and having a key guide portion; and a lens holding frame holding a lens and having, on an inner surface thereof, a cam on said inner surface engaging said key guide portion, wherein said second cam frame is moved forward/rearward along the optical axis due to rotation of said first cam frame, and said lens holding frame is further moved forward/rearward along the optical axis along said key guide portion of said movable frame.

30. A lens barrel comprising:

a fixed frame;

a first cam frame disposed on an outer surface of said fixed frame;

a second cam frame disposed in said fixed frame;

at least one first lens holding frame disposed in said second cam frame; and a movable member disposed at an end portion of said second cam frame and having key guide portion extending in a direction of an optical axis, said fixed frame having a first cam groove for moving forward/rearward said second cam frame along the optical axis while at least rotating said second cam frame around the optical axis and a second cam groove for guiding said movable member along the optical axis with respect to said fixed frame;

a third cam groove, engaging a cam follower formed on said lens holding frame, and being formed in an inner surface of said second cam frame;

said first lens holding frame having a guide portion engaging said key guide portion of said movable member;

a first receiving member coupled to said second cam frame and engaging the movable member for restricting the forward/rearward movement of said movable member along the optical axis with respect to said second cam frame and allowing rotation of said movable member around the optical axis; and rotation of said first cam frame with respect to said fixed frame causing said second cam frame to move forward/rearward along the optical axis while rotating due to a cooperative action of said first cam groove and said second cam groove, said movable member being moved forward/rearward along the optical axis due to a cooperative action of said third cam groove and said first receiving member, and said lens holding frame being moved forward/rearward along the optical axis due to a cooperative action of said second cam frame, a fourth guide groove and said movable member.

31. A lens barrel comprising:

a fixed frame fixed to a camera body;

a first cam frame disposed on an outer surface of said fixed frame;

a second cam frame disposed in said fixed frame;

at least one first lens holding frame disposed in said second cam frame;

a movable member disposed at an end portion of said second cam frame and having key guide portion extending in a direction of an optical axis; and a first receiving member disposed on said second cam frame and arranged to restrict forward/rearward movement of said movable member along the optical axis with respect to said second cam frame and to allow rotation of said movable member around the optical axis, wherein each cam means and fastening means is structured in such a manner that relative rotation between said fixed frame and said first cam frame around the optical axis causes said second cam frame to be moved forward/rearward along the optical axis while being rotated around the optical axis, and relative rotation of said second cam frame around the optical axis with respect to said fixed frame and rotation of said movable member around the optical axis with respect to said second cam frame cause said lens holding frame to move forward/rearward along the optical axis with respect to said second cam frame.

32. A lens barrel comprising:

an annular-shaped fixed frame joined to a camera body;

a first annular-shaped cam frame rotatably disposed about an outer periphery of said fixed frame for rotation about an optical axis;

a second annular-shaped cam frame disposed within an interior of said fixed frame for rotation about the optical axis;

said second cam frame having cam follower means cooperating with first and second cam means respectively provided in said first cam frame and said fixed frame for moving said second cam frame;

an annular-shaped float key member positioned within said second cam frame;

receiving means coupling said float key member and said second cam frame whereby movement of said second cam frame is imparted to said float key member;

a lens holding frame disposed within said second cam frame and including guide means engaged by a key guide portion of said float key member to limit movement of said lens holding frame according to the limited movement of said float key member.

33. A lens barrel according to claim 32, wherein the guide means of said lens holding frame is arranged about an outer periphery thereof.

34. A lens barrel according to claim 33, including a second lens holding frame disposed within said cam frame and having guide means engaging a key guide portion of said float key member to limit movement of said second lens frame according to the limited movement of said float key member.

35. A lens barrel according to claim 34, wherein said guide means of said second lens holding frame engaging said arm is arranged along an interior surface thereof;

said key guide portion being positioned between the interior surface of second lens holding frame and the exterior surface of said first lens holding frame.

36. A lens barrel according to claim 32, wherein said lens holding frame is provided with an outwardly extending annular projection extending toward an interior surface of said second cam member for blocking light rays from passing therebetween.

* * * * *